(12) United States Patent
Tamam et al.

(10) Patent No.: US 12,485,821 B2
(45) Date of Patent: Dec. 2, 2025

(54) METHOD FOR DEFINING THE CLOTHES TYPE OF AN OCCUPANT OF A VEHICLE

(71) Applicant: VALEO COMFORT AND DRIVING ASSISTANCE, Créteil (FR)

(72) Inventors: Mahmoud Tamam, Créteil (FR); Audrey Quessada, Créteil (FR); Nicolas Ringelstein, Créteil (FR); Mahmoud Elkhateeb, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 66 days.

(21) Appl. No.: 18/567,969

(22) PCT Filed: Jun. 10, 2022

(86) PCT No.: PCT/EP2022/065906
§ 371 (c)(1),
(2) Date: Dec. 7, 2023

(87) PCT Pub. No.: WO2022/268537
PCT Pub. Date: Dec. 29, 2022

(65) Prior Publication Data
US 2024/0262292 A1      Aug. 8, 2024

(30) Foreign Application Priority Data

Jun. 21, 2021   (EP) ..................... 21180680

(51) Int. Cl.
*B60R 1/29*        (2022.01)
*G06V 20/59*       (2022.01)
*G06V 40/10*       (2022.01)

(52) U.S. Cl.
CPC .............. *B60R 1/29* (2022.01); *G06V 20/593* (2022.01); *G06V 40/103* (2022.01)

(58) Field of Classification Search
CPC ...... B60R 1/29; G06V 20/593; G06V 40/103; G06V 10/26; G06V 10/82; G06V 20/59
(Continued)

(56) References Cited

U.S. PATENT DOCUMENTS

2009/0116698 A1* 5/2009 Zhang ................ G06Q 30/0601
                                                         345/581
2016/0203361 A1* 7/2016 Black ........................ G06T 7/75
                                                         382/203
(Continued)

FOREIGN PATENT DOCUMENTS

WO    WO-2020260328 A1 * 12/2020

OTHER PUBLICATIONS

C. Grana, S. Calderara, D. Borghesani and R. Cucchiara, "Learning non-target items for interesting clothes segmentation in fashion images," Proceedings of the 21st International Conference on Pattern Recognition (ICPR2012), Tsukuba, Japan, 2012, pp. 3317-3320 (Year: 2012).*

(Continued)

Primary Examiner — Marnie A Matt
(74) Attorney, Agent, or Firm — Osha Bergman Watanabe & Burton LLP

(57) ABSTRACT

A method for defining the clothes type of an occupant of a vehicle is disclosed. The method includes acquiring a video stream of the cabin of the vehicle, performing skin segmentation from images of the video stream to classify each image pixels as skin pixels, non skin human pixels, and background pixels, and detecting key body points of each occupant of the vehicle from the images. The method also includes calculating the skin versus non skin percentage levels over the body parts of each occupant of the vehicle seen in the image and defining the clothes type of each (Continued)

Figure 1:
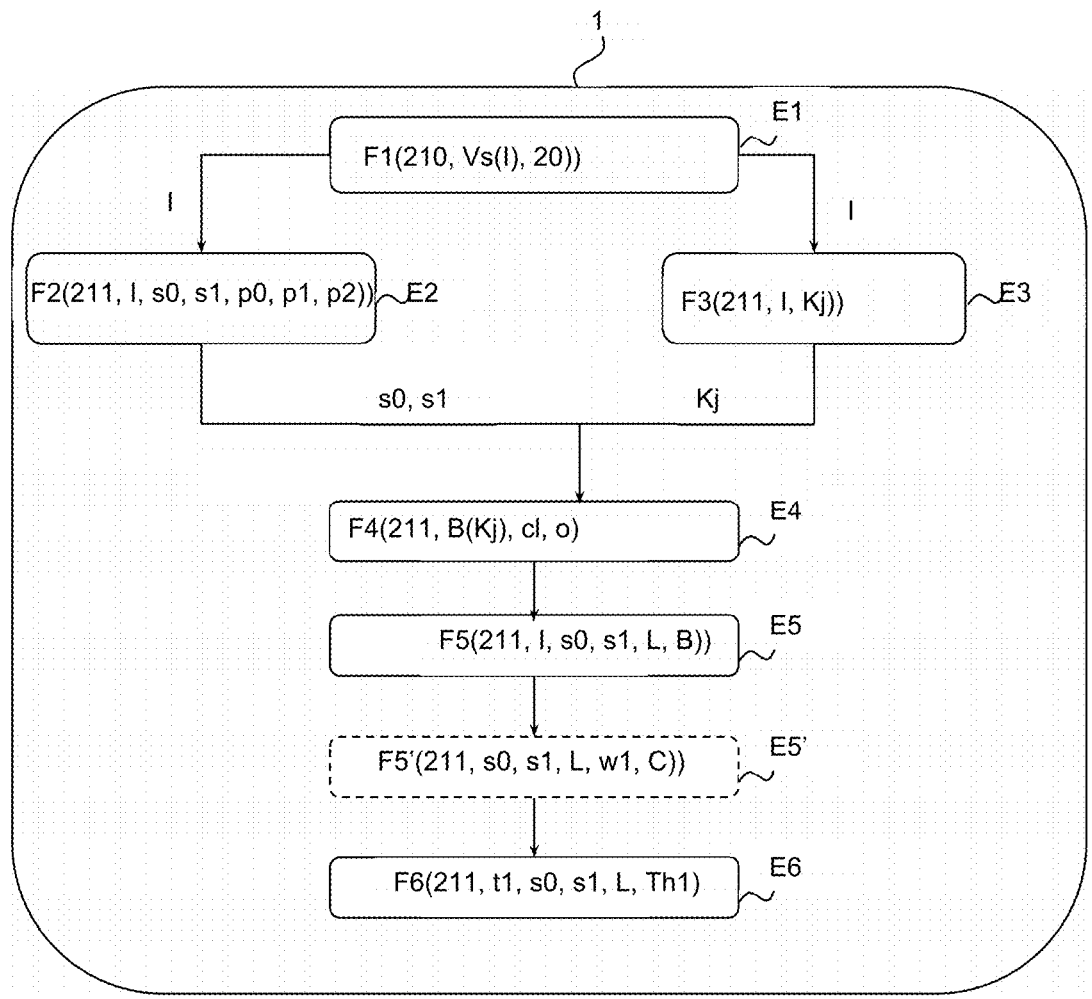

occupant based on the calculated skin versus non skin percentage levels of each body part of each occupant.

16 Claims, 8 Drawing Sheets

(58) Field of Classification Search
USPC .......................................................... 348/148
See application file for complete search history.

(56) References Cited

U.S. PATENT DOCUMENTS

2021/0402942 A1* 12/2021 Torabi ..................... G06N 3/02
2023/0126829 A1*  4/2023 Grigorev ................ G06T 19/00
                                                                    345/419

OTHER PUBLICATIONS

J. Liu, I. W. Foged and T. B. Moeslund, "Vision-based Individual Factors Acquisition for Thermal Comfort Assessment in a Built Environment," 2020 15th IEEE International Conference on Automatic Face and Gesture Recognition (FG 2020), Buenos Aires, Argentina, 2020, pp. 662-666 (Year: 2020).*

A. De Souza Inácio and H. S. Lopes, "EPYNET: Efficient Pyramidal Network for Clothing Segmentation," in IEEE Access, vol. 8, pp. 187882-187892, 2020 (Year: 2020).*

Z. Cao, G. Hidalgo, T. Simon, S.-E. Wei and Y. Sheikh, "OpenPose: Realtime Multi-Person 2D Pose Estimation Using Part Affinity Fields," in IEEE Transactions on Pattern Analysis and Machine Intelligence, vol. 43, No. 1, pp. 172-186, Jan. 1, 2021 (Year: 2021).*

Lee, Wonseok et al: "Clothing Attribute Extraction Using Convolutional Neural Networks", Knowledge Management and Aquisition for Intelligent Systems, Jul. 27, 2018. PKAW 2018. Lecture Notes in Computer Science, vol. 11016, pp. 241-250. https://doi.org/10.1007/978-3-319-97289-3_19.

Cao Zhe et al: "Realtime Multi-person 2D Pose Estimation Using Part Affinity Fields", 2017 IEEE Conference on Computer Vision and Pattern Recognition (CVPR), IEEE Computer Society, US, Jul. 21, 2017 (Jul. 21, 2017), pp. 1302-1310, XP033249469, ISSN: 1063-6919, DOI: 10.1109/CVPR.2017.143 (10 pages).

International Search Report and Written Opinion in corresponding International Application No. PCT/EP2022/065906, dated Sep. 6, 2022 (10 pages).

* cited by examiner

METHOD FOR DEFINING THE CLOTHES TYPE OF AN OCCUPANT OF A VEHICLE

The present invention relates to a method for defining the clothes type of an occupant of a vehicle. Such a method may be used, but not exclusively, for tuning a heating, ventilation and air-conditioning system of a vehicle.

For defining the clothes type of a person, a method well-known by the man skilled in the art comprises the steps of:
- acquiring a video stream of people within a cabin of a vehicle,
- performing clothes classification based on a convolution neural network that is trained on a MHP (Multi Human Parsing) of 43 000 images of people wearing different types of clothes.

One problem of this prior art is that the MHP dataset used is not adapted to train the model accurately on people within a cabin of a vehicle.

When using the MHP dataset, the accuracy will be low as it is not specialized on images inside the cabin of the vehicle.

It is an object of the invention to provide a method for defining the clothes type of an occupant of a vehicle, which resolves the problem above-stated.

To this end, it is provided a method for defining the clothes type of an occupant of a vehicle, said method comprising:
- acquiring at least one video stream of the cabin of said vehicle,
- performing skin segmentation from images of said at least one video stream to classify each image pixels into skin versus non skin as human pixels or into background pixels,
- detecting from said images of said video stream body key points per occupant within said cabin,
- determining from said body key points body parts of each occupant within said cabin, a body part being a connection between at least two body key points,
- for each image of the video stream, calculating skin versus non skin percentage levels over body parts of each occupant,
- for each occupant of the vehicle, defining clothes type based on said skin versus non skin percentage levels of each body part of said occupant.

Hence, as we will see in detail later, thanks to the skin segmentation based on a UNET meta-model that is tuned with a specific dataset of images of people within a cabin of a vehicle, and thanks to the skin segmentation in combination with the body parts, one can define very accurately the clothes type of a person who is within the cabin of a vehicle where the luminance is lower than a more open area.

According to non-limitative embodiments of the invention, the method in accordance with the invention further comprises the following characteristics.

In a non-limitative embodiment, the skin segmentation is based on a UNET meta-model.

In a non-limitative embodiment, the body key points detection is based on a semi-supervised learning model.

In a non-limitative embodiment, said method further comprises calculating a confidence level regarding said skin versus non skin percentage levels based on a local moving window of images.

In a non-limitative embodiment, the defining of clothes type is based on a comparison of the skin versus non skin percentage levels to a threshold.

In a non-limitative embodiment, the body parts are a face, a torso, a neck, a right/left upper arm, a right/left lower arm, a right/left hand, an upper right/left knee leg.

In a non-limitative embodiment, the clothes type is defined among short/long/bottom cloth, or short/long sleeves top cloth.

In a non-limitative embodiment, the skin segmentation step is based on a convolution neural network that combines a RESNET-101 model as en encoder and a UNET model as a decoder.

There is also provided a system for defining the clothes type of an occupant of a vehicle, said system comprising at least one camera configured to acquire a video stream of the cabin of said vehicle, wherein said system further comprises an electronic control unit configured to:
- perform skin segmentation from images of said video stream to classify each image pixels into skin versus non skin as human pixels or into background pixels,
- detect from said images of said video stream body key points per occupant within said cabin,
- determine from said body key points body parts of each occupant within said cabin, a body part being a connection between at least two body key points,
- for each image of the video stream, calculate skin versus non skin percentage levels over body parts of each occupant,
- for each occupant of the vehicle, define clothes type based on said skin versus non skin percentage levels of each body part of said occupant.

According to non-limitative embodiments of the invention, the system in accordance with the invention further comprises the following characteristics.

In a non-limitative embodiment, said electronic control unit is further configured to calculate a confidence level regarding said skin versus non skin percentage levels based on a local window of images.

In a non-limitative embodiment, said at least one camera is a camera fisheye.

There is also provided a skin segmentation method for classifying pixels of an image into a plurality of classes within which a skin class, a non-skin class and a background class, wherein said image is coming from a cabin of a vehicle, and wherein said method comprises:
- training a UNET meta-model for said classification, said training being based on a primary sub-set of a primary dataset comprising a primary number of primary annotated images of persons wearing different type of clothes, said UNET meta-model comprising an encoder that is a deep learning model that cooperates with a decoder to output skin segmented images with pixels wherein said pixels are associated to one class among said skin class, said non-skin class and said background class,
- testing said UNET meta-model with a secondary sub-set of said primary dataset, said secondary sub-set being the supplementary subset to said primary sub-set, said testing leading to a primary accuracy percentage,
- running said UNET meta-model with a secondary dataset comprising a secondary number of non-annotated images of persons wearing different type of clothes within a cabin of a vehicle, said secondary number being at least a hundred times smaller than the primary number, said running leading to output skin segmented images with pixels wherein said pixels are associated to one class among said skin class, said non-skin class and said background class, fixing some of said skin segmented images to create a skin segmented secondary dataset, combining a third subset of said skin segmented secondary dataset with the primary dataset to form an augmented dataset, and retraining the UNET meta-model with this augmented dataset, said retraining outputting skin segmented images with pixels wherein said pixels are associated to one class among said skin class, said non-skin class and said background class, testing said UNET meta-model with a fourth sub-set of said skin segmented secondary dataset, said fourth sub-set being the supplementary subset to said third sub-set, said testing leading to a secondary accuracy percentage.

According to non-limitative embodiments of the invention, the skin segmentation method in accordance with the invention further comprises the following characteristics.

In a non-limitative embodiment, the secondary dataset comprises non-annotated images of real images of persons within a cabin of the vehicle, said persons wearing different types of clothes.

In a non-limitative embodiment, said non-annotated images are extracted from a video stream of a camera fisheye.

In a non-limitative embodiment, said encoder is a UNET RESNET 101 model.

In a non-limitative embodiment, the primary dataset of is a MHP dataset or a CIHP dataset.

In a non-limitative embodiment, the secondary number of said secondary dataset is around 100.

Figure 2:
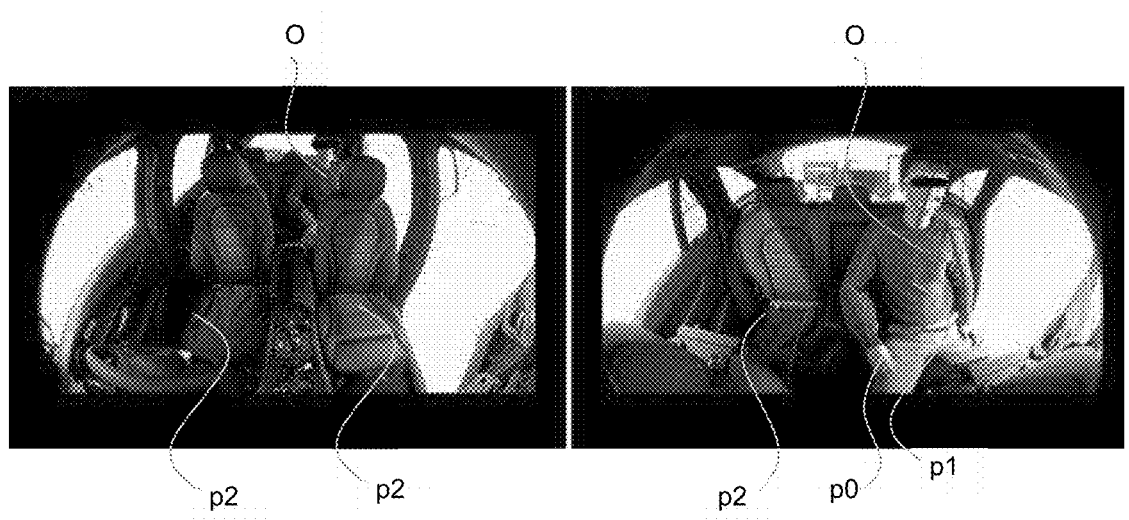
Figure 3:
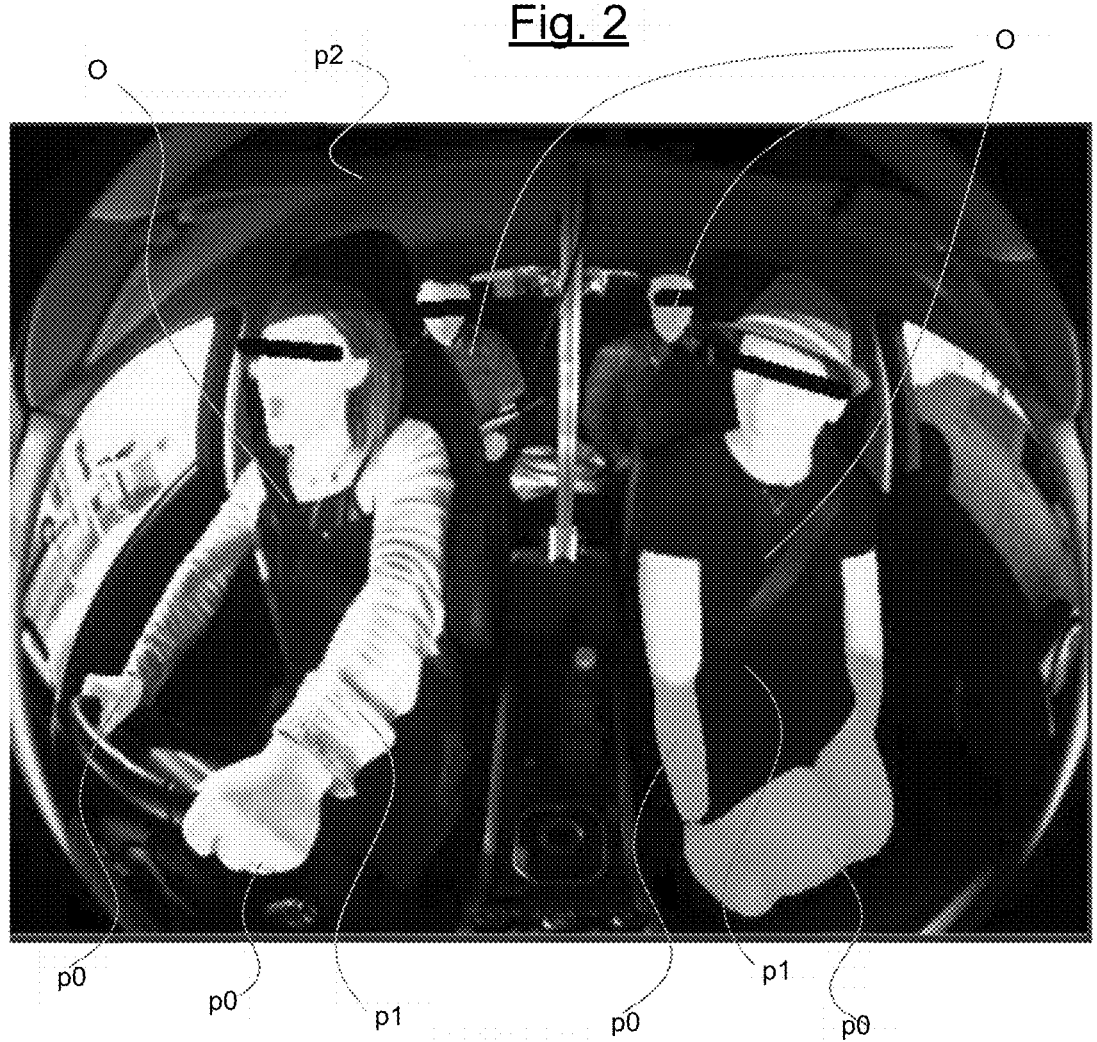
Figure 4:
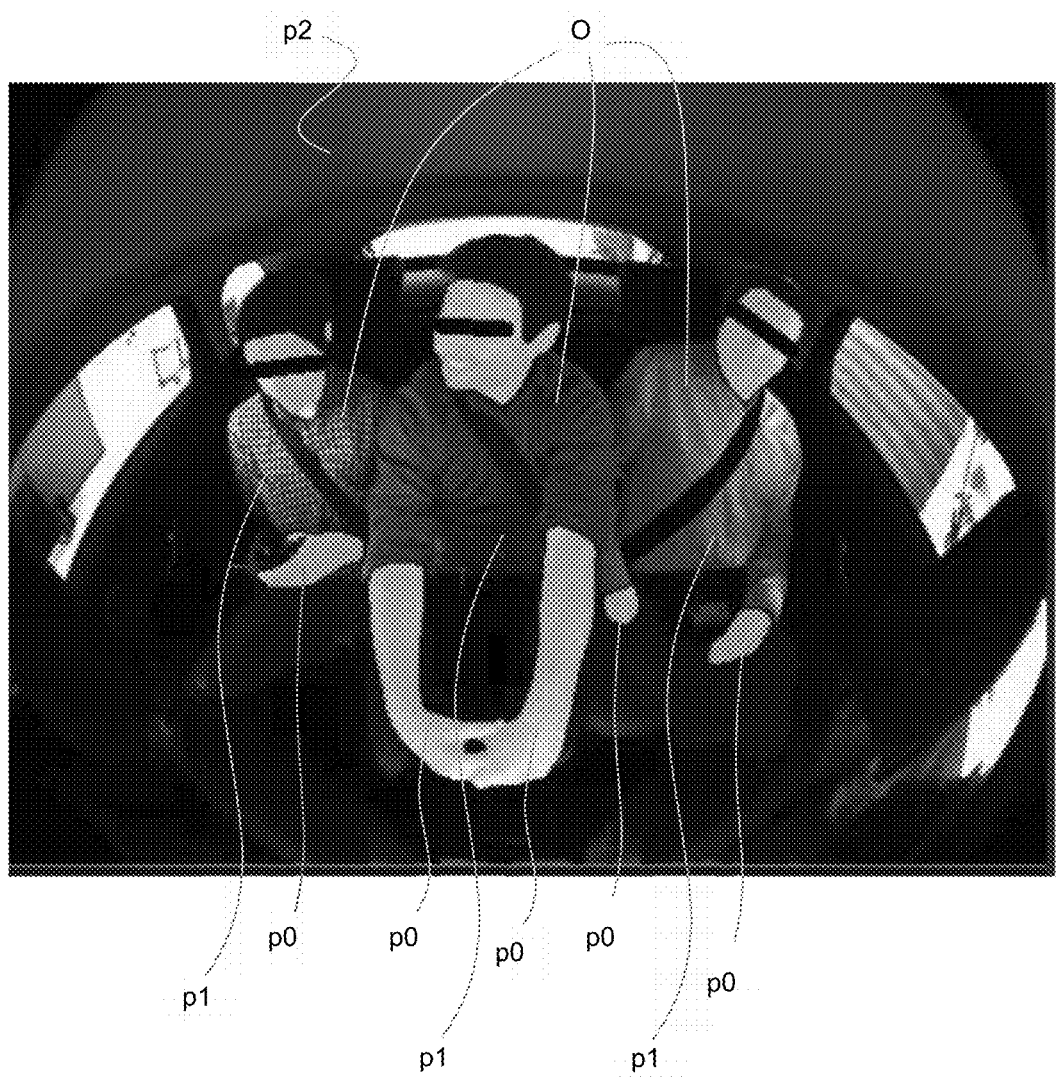
Figure 5:
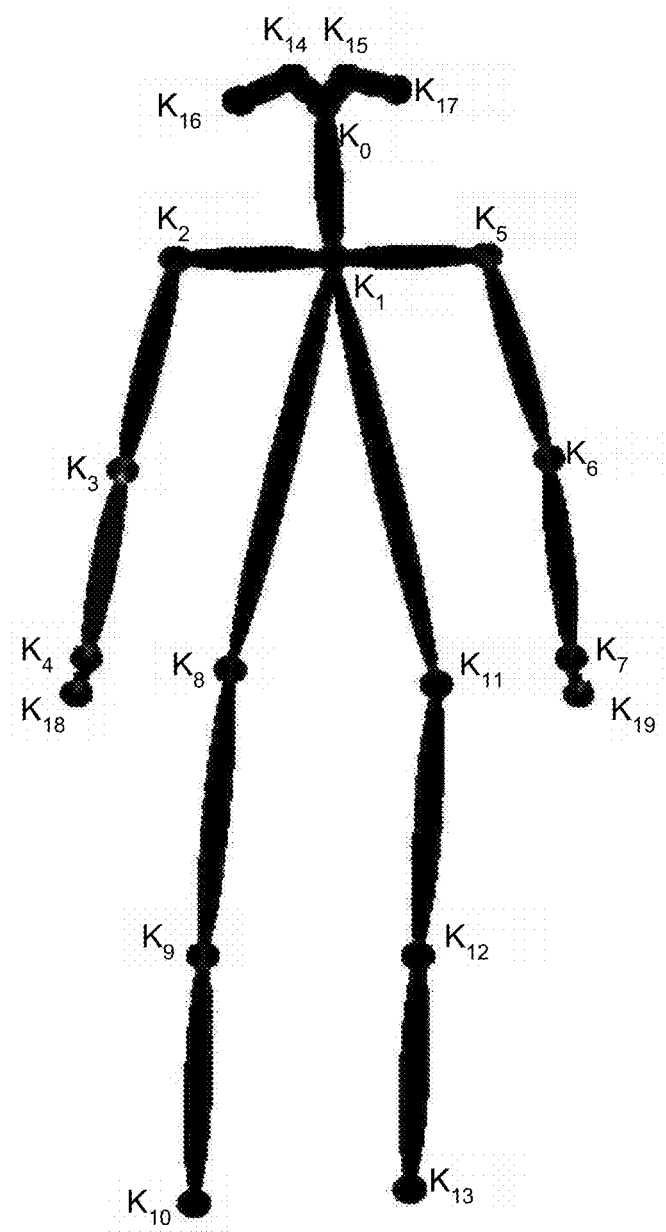
Figure 6:
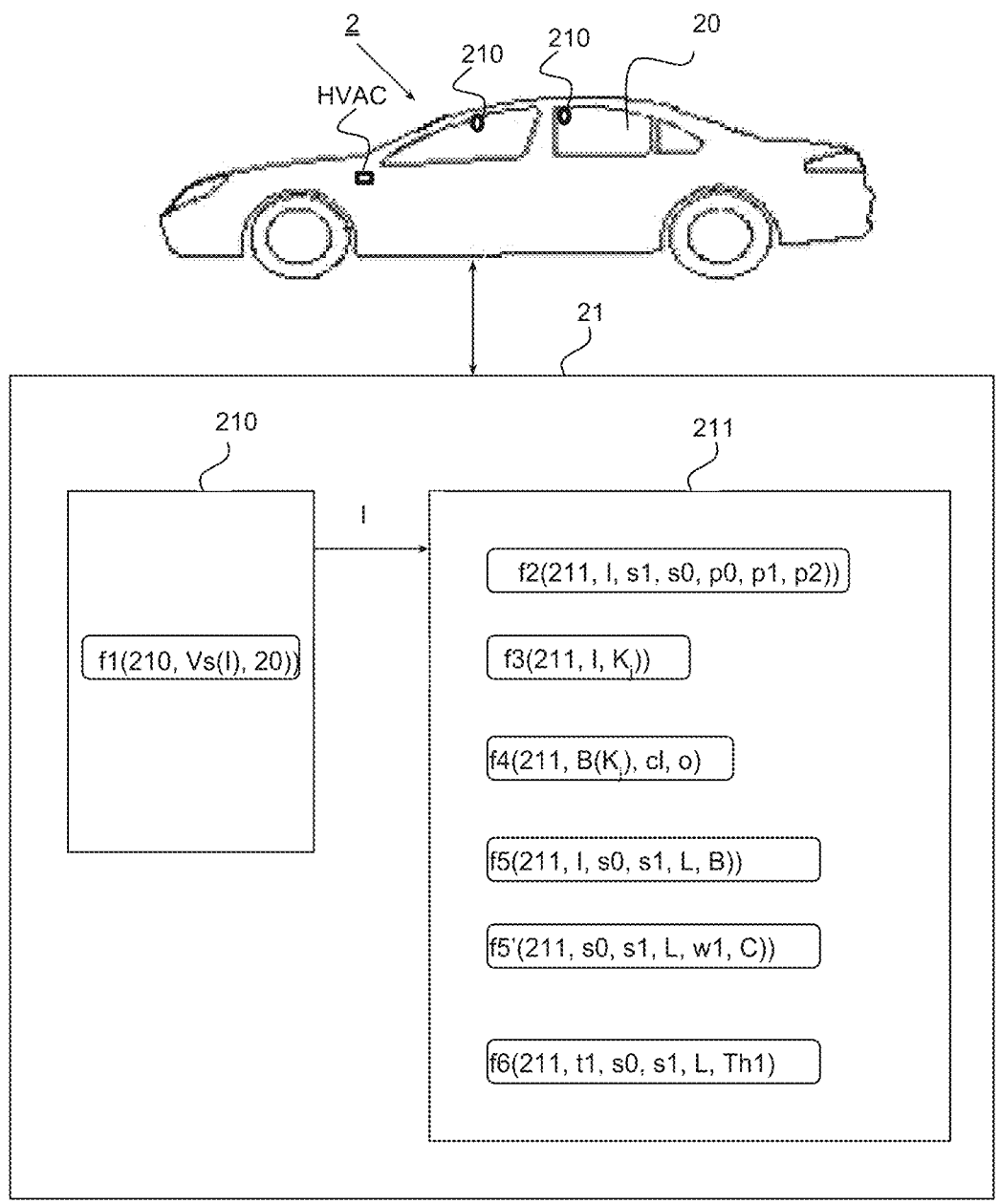
Figure 7:
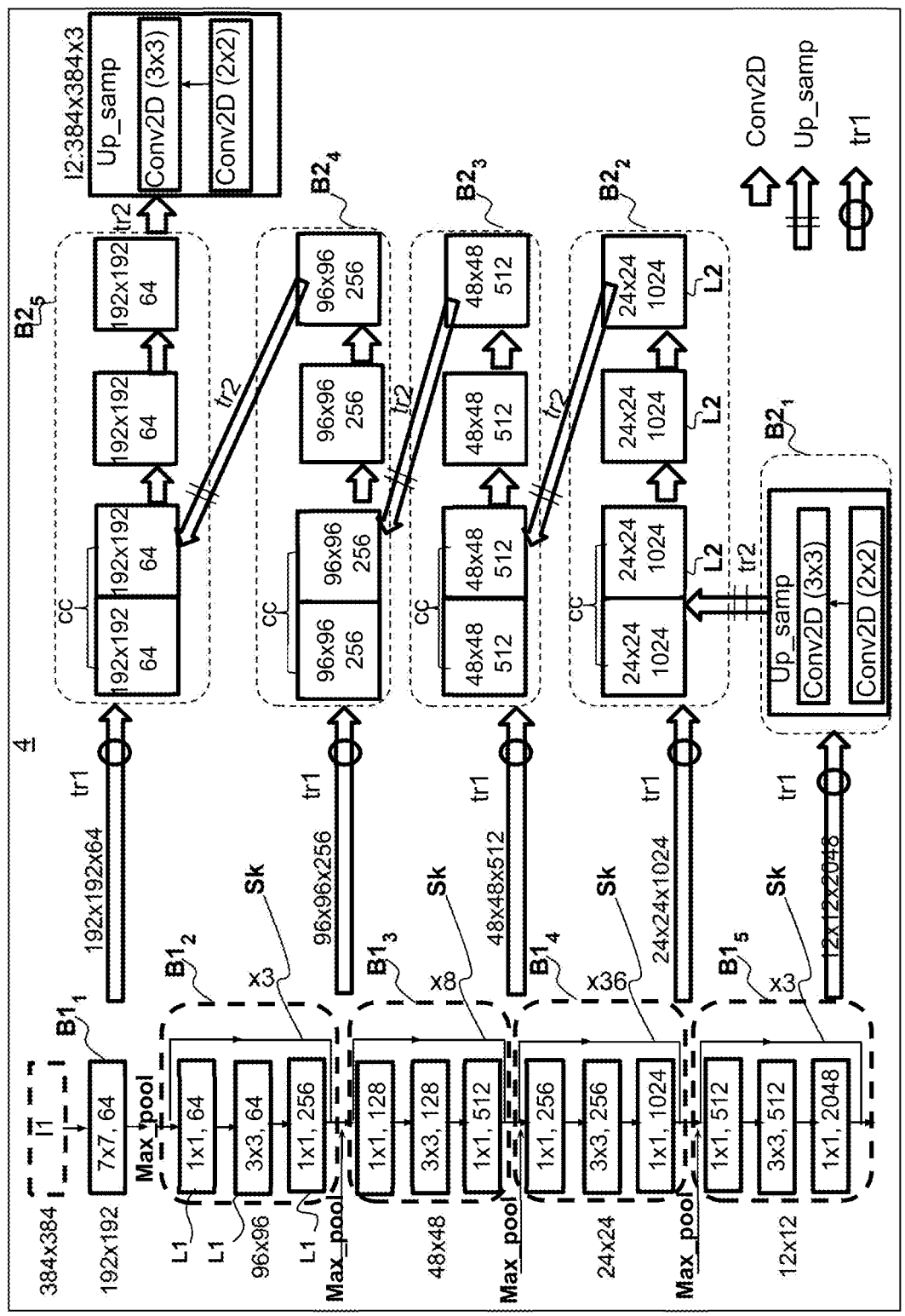
Figure 8:
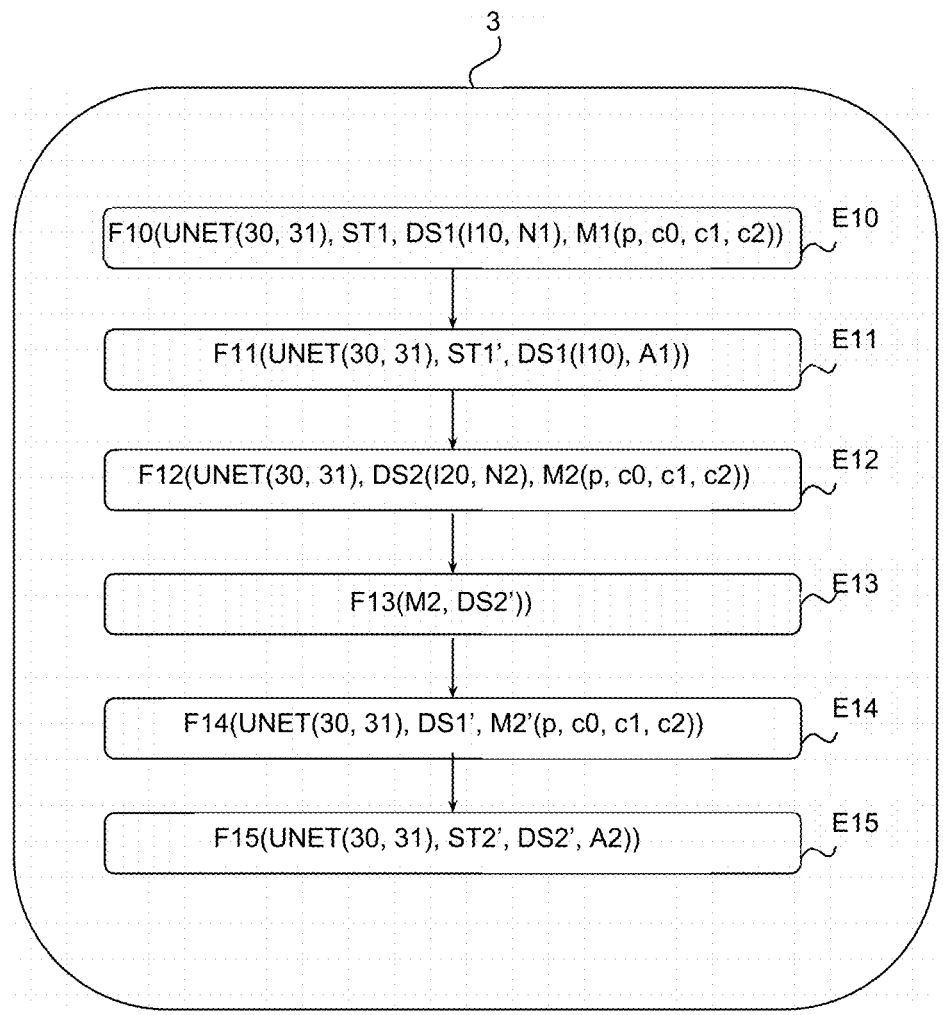
Figure 9:
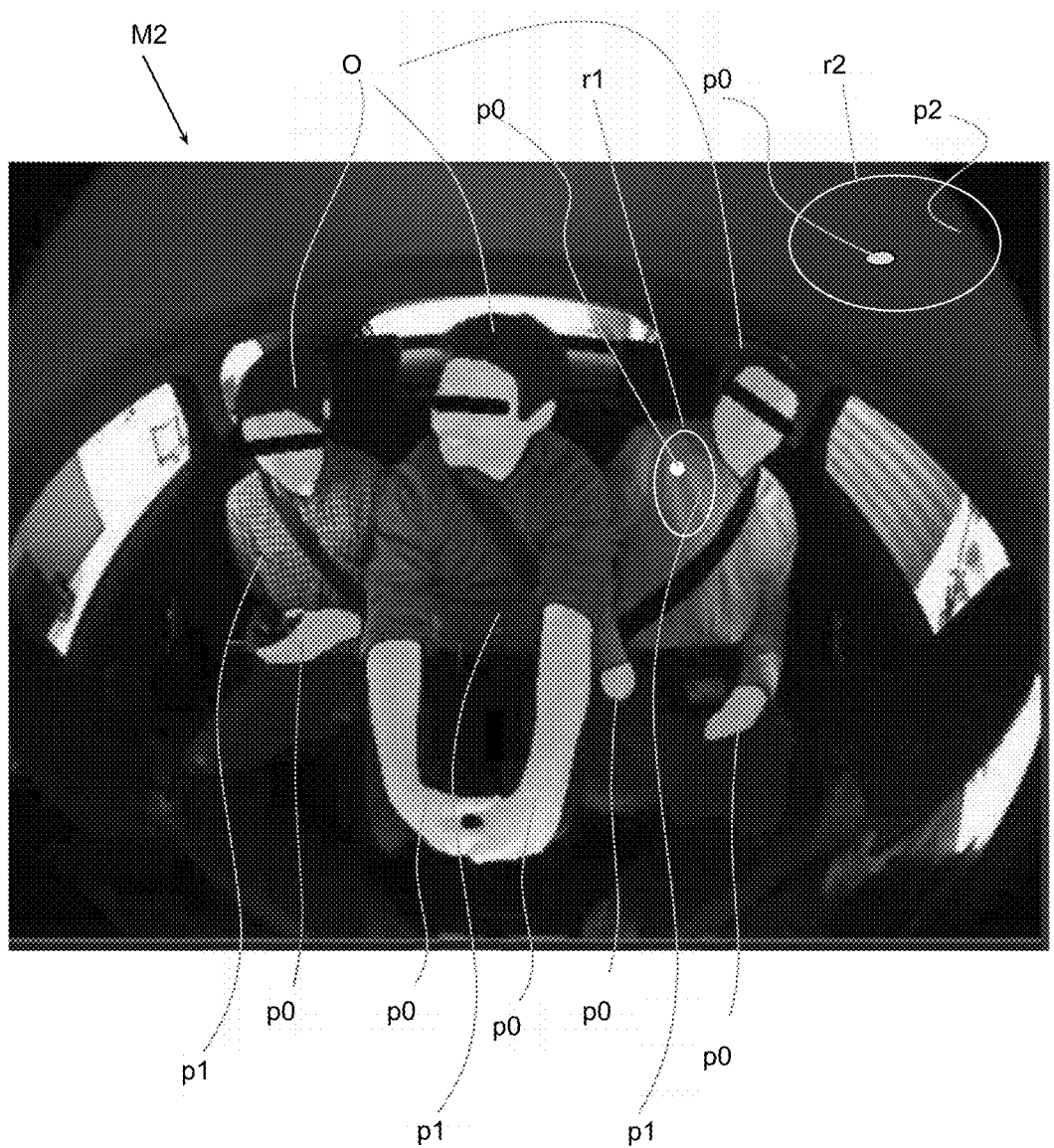

Some embodiments of methods and/or apparatus in accordance with embodiments of the present invention are now described, by way of example only, and with reference to the accompanying drawings, in which:

FIG. 1 is a schematic diagram which illustrates a method for defining the clothes type of an occupant of a vehicle, according to a non-limitative embodiment of the invention, FIG. 2 is a first image coming from a video stream acquired according to a step of the method of FIG. 1, said image illustrating front seats and rear seats occupancy of a cabin of a vehicle, according to a non-limitative embodiment, FIG. 3 is a second image coming from a video stream acquired according to a step of the method of FIG. 1, said image illustrating a cabin of a vehicle inhabited by two persons in the front row and two persons in the rear row, according to a non-limitative embodiment, FIG. 4 is a third image coming from a video stream acquired according to a step of the method of FIG. 1, said image illustrating a rear row of a cabin of a vehicle inhabited by three persons in the row seats, according to a non-limitative embodiment, FIG. 5 illustrates body key points from which body parts are detected by the method of FIG. 1, according to a non-limitative embodiment, FIG. 6 is a schematic diagram of a system which is configured to carry out the method of FIG. 1, according to a non-limitative embodiment, FIG. 7 is a schematic diagram of a UNET meta-model used by the method of FIG. 1 for a skin segmentation, according to a non-limitative embodiment, FIG. 8 is a schematic diagram which illustrates a method for skin segmentation using the UNET meta-model of FIG. 7, according to a non-limitative embodiment, FIG. 9 is the image of FIG. 4 where a fixing step of the skin segmented method of FIG. 8 will be performed, according to a non-limitative embodiment.

In the following description, well-known functions or constructions by the man skilled in the art are not described in detail since they would obscure the invention in unnecessary detail.

The present invention relates to a method 1 for defining the clothes type of an occupant o of a vehicle 2, said method 1 being described in reference to FIG. 1, according to non-limitative embodiments. In a non-limitative embodiment, said vehicle 2 is an automobile vehicle. In non-limitative examples, said automobile vehicle is a motor vehicle, or an electrical vehicle, or a hybrid vehicle.

As illustrated in FIG. 6, the vehicle 2 comprises a cabin 20 and a system 21 comprising at least one camera 210 and an electronic control unit 211. In a non-limitative embodiment, the at least one camera 210 is a camera fisheye. In a non-limitative embodiment, said system 21 comprises a plurality of cameras 210. In a non-limitative variant of embodiment, the system 21 comprises two cameras 210, one camera 210 in the front configured to acquire video streams Vs of the front row, and one camera 210 in the rear configured to acquire video streams Vs of the rear row.

As illustrated in FIG. 1, the method 1 comprises the following steps in a non-limitative embodiment.

In step E1, illustrated F1(210, Vs(I), 20), the camera 210 acquires at least one video stream Vs of the cabin 20 of said vehicle 2. The video stream Vs is composed of a plurality of images I of the cabin 20, and an image I is composed of a plurality of pixels p. When there are two cameras 210, there are two video streams Vs, one of the front row and one of the rear row. Hence, the camera 210 acquires images I of the persons o that are within the cabin 20, that is to say the occupants o of the vehicle 2. In the following the terms person or occupant are used indifferently. FIG. 2 illustrates on the left an image I of an empty front row of the cabin 20, and on the right an image I of the rear row of the cabin 20 with a person on a rear row. FIG. 3 illustrates an image I of a cabin 20 with four persons o, two in the front row, and two in the rear row. FIG. 4 illustrates an image I the rear row of the cabin 20 with three persons o on the rear row. Hence, with the images I of the video stream(s) Vs, one can see if there are some persons o in the vehicle 2 and on which row they sit.

In step E2, illustrated F2(211, I, s0, s1, p0, p1, p2), a skin segmentation from images I of said at least one video stream Vs is performed to classify each image pixels p into skin s0 versus non skin s1 as human pixels p0, p1 or into background pixels p2.

Hence, there are three classes that are a skin class c0, a non-skin class c1 and a background class c2. When a pixel p belongs to the background class c2, it means that it doesn't belong to a person o. When a pixel p belongs to the non-skin class c1, it means that it belongs to a part of the body of a person o covered with a cloth. When a pixel p belongs to the skin class c0, it means that it belongs to a part of the body of a person o that is not covered with a cloth.

In the example of FIG. 2, in the image I (in the left) of the front row, the pixels p referenced p2 belong to the background class c2 as there is nobody in the front row of the cabin 20. In the example of FIG. 2, in the image I (in the right) of the rear row, the pixel p referenced p0 belongs to the skin class c0, as it relates to a hand of the person who sits in the front row, and the pixel p referenced p1 belongs to the non-skin class c1 as it relates to a cloth of said person, and the pixel p referenced p2 belongs to the background class c2 as there is nobody on one of the seat of the rear row. In the same manner, in FIG. 3 and FIG. 4, one can find pixels p0, p1, p2 of the three classes c0, c1 and c2.

A non-limitative embodiment of skin segmentation method 3 is described later in the following.

It is to be noted that the electronic control unit 211 is configured to perform all the steps of the skin segmentation method 3 save the fixing step E13 described later in the following.

In step E3, illustrated F3(211, I, $K_i$), the electronic control unit 211 detects from said images I of said video stream Vs body key points $K_i$ (i=0 to N, with N a natural number) per occupant o within the cabin 20. As illustrated in FIG. 5, in a non-limitative embodiment, there are 20 body key points $K_i$ (i=0 to 19). In another non-limitative embodiment, one can have more body key points $K_i$. When there are two video streams Vs, the electronic control unit 211 detects the body key points $K_i$ from the images I of said two video streams Vs.

In a non-limitative embodiment, the detection is performed by a semi-supervised learning model. In a non-limitative variant, the semi-supervised learning model is an OpenPose model. Such OpenPose model is described in the publication "Realtime Multi-Person 2D Pose Estimation using Part Affinity Fields" by Zhe Cao, Gines Hidalgo, Tomas Simon, Shih-En Wei, Yaser Sheikh and submitted to the IEEE Transactions on pattern analysis and machine intelligence.

Although FIG. 1 illustrates the operations in parallel, in another non-limitative embodiment, the operations E2 and E3 can also be executed in a sequential form in any order.

In step E4, illustrated F4(211, B($K_i$), cI, o), the electronic control unit 211 determines from said body key points $K_i$ body parts B of each occupant o within said cabin 20, a body part B being a connection between at least two body key points $K_i$. In a non limitative example, if the body part B is the torso, it is defined by four body key points $K_i$. By using each person's body key points $K_i$, the electronic control unit 211 can classify each pixel p per occupant o to different body parts classes cI as in a non-limitative embodiment face class (cI0), torso class (cB1), neck class (cB2), right/left upper arm class (cI3/cI4), right/left lower arm class (cI5/cI6), right/left hand class (cI7/cI8), upper knee right/left leg class (cI9/cB10). Hence, one knows to which body part B belongs a pixel p of an image I. When an occupant o is sitting, usually, the camera 210 can't see the lower knee legs or the feet. However, other body parts classes cI such as foot class or lower knee right/left leg class may be also used.

In the non-limitative example of FIG. 5, the neck is defined between the body key points $K_0$ and $K_1$. The face is defined between the body key points $K_{14}$, $K_{15}$, $K_{16}$ and $K_{17}$. The torso is defined between the body key points $K_1$, $K_8$ and $K_{11}$. The right upper arm is defined between the body key points $K_2$ and $K_3$. The left upper arm is defined between the body key points $K_5$ and $K_6$. The right lower arm is defined between the body key points $K_3$ and $K_4$. The left lower arm is defined between the body key points $K_6$ and $K_7$. The right hand is defined between the body key points $K_4$ and $K_{18}$. The left hand is defined between the body key points $K_7$ and $K_{19}$. The upper knee right leg is defined between the body key points $K_8$ and $K_9$. The upper knee left leg is defined between the body key points $K_{11}$ and $K_{12}$. The lower knee left leg is defined between the body key points $K_{12}$ and $K_{13}$. The lower knee right leg is defined between the body key points $K_9$ and $K_{10}$.

It is to be noted that one can have more body key points $K_i$ than 20 body key points $K_i$. In a non-limitative example, one can have more body key points $K_i$ for the face, or for the torso.

In step E5, illustrated F5(211, I, s0, s1, L, B), the electronic control unit 211 calculates for each image I of the video stream Vs, skin s0 versus non skin s1 percentage levels L over body parts B of each occupant o. When there are two video streams Vs, the electronic control unit 211 calculates them for each image I of said two video streams Vs.

In a non limitative embodiment, the body parts B are a face, a torso, a neck, a right/left upper arm, a right/left lower arm, a right/left hand, an upper right/left knee leg. Hence, by using the per person body part classes cI and the skin segmentation classes c, the electronic control unit 211 can calculate the skin and clothing percentage level L for each body parts B of an occupant o. A body part B comprises:
  pixels p0 belonging to class c0 (skin), and/or
  pixels p1 belonging to class c1 (non skin, that is to say cloth).

And, to each body part B is associated a percentage level L of skin s0 versus non skin s1. In other words, for each body part B, the electronic control unit 211 gathers the pixels p and defines the percentage level L of skin s0 versus non skin s1, i.e. cloth. In a non-limitative embodiment, other body parts B such as foot or lower knee right/left leg may be also used.

In a non-limitative embodiment, one uses a local moving window of images w1 and do voting per each body part B using previous and current information of skin s0 versus non skin s1 percentage level L, and one gives confidence C based on matching of readings in this local moving window of images w1. Confidence C is computed as the likelihood of a certain value level over the local moving window of images w1. For example if we have 5 images with skin percentage level for a certain body part B, the confidence will be 100%, but if we have 4 images with a certain skin percentage level and 1 image with different measurement, the confidence will be 80%. In a non-limitative embodiment, the local moving window of images w1 comprises 20 images. Hence, in a non-limitative embodiment, in a step E5', illustrated F5'(211, s0, s1, L, w1, C), the electronic control unit 211 calculates a confidence level C regarding said skin s0 versus non skin s1 percentage levels L based on a local window of images w1. As this step E5' is not mandatory, it is illustrated in dotted lines. If within the local moving window of images w1, the different computations of percentage levels L of non-skin s0 are closed, the confidence C is high. The same goes for the computations of percentage levels L of cloth s1. In other words, if in the current image I, the percentage level L matches the one computed in the previous images I, the confidence C is high, otherwise, it is low. If it is low, the previous percentage level L (that is to say the percentage level L in the previous image I) is taken into account for the next step whereas the current percentage level L is skipped. In a non-limitative embodiment, there are 11 levels of percentage levels: 0, 10, 20, 30, 40, 50, 70, 80, 90, 100. So the matching is considered when measurements are within the same percentage level L.

In step E6, illustrated F6(211, t1, s0, s1, L, Th1), the electronic control unit 211 defines clothes type t1 (also called type of clothes) based on said skin s0 versus non skin s1 percentage levels L of each body part B of said occupant o. To this end, the electronic control unit 211 compares the skin s0 versus non skin s1 percentage levels L to a threshold Th1. In non-limitative embodiments, the clothes type t1 can be defined among the following list: short/long/bottom cloth, or short/long sleeves top cloth. With the body part B, one can define if the cloth type t1 is defined among a bottom cloth or a top cloth, and with the skin s0 versus non skin s1 percentage levels L, one can define if the bottom cloth is short or long, if the top cloth has short or long sleeves, and if the top cloth covers the neckline.

In a non-limitative embodiment, the threshold Th1 is equal to 60%. Hence, if the skin s0 versus non skin s1 percentage level L is higher than 60%, it means that there is more skin s0 than cloth s1 and therefore the occupant o is wearing a short cloth, such as a short knee skirt or shorts, or a sleeves shirt that is short in non-limitative examples. Hence, if the skin s0 versus non skin s1 percentage level L is lower than 60%, it means that there is more cloth s1 than skin s0 and therefore the occupant o is wearing a long cloth, such as a long skirt or trousers, or a sleeves shirt with long sleeves in non-limitative examples.

Hence, as the clothes type t1 has been defined for each occupant o of the vehicle, it is possible to tune the HVAC system based on this information. There is no need of clothes classification model.

Hence, the method 1 is carried out by a system 21 illustrated in FIG. 6. The system 21 comprises at least one camera 210 and an electronic control unit 211. In a non-limitative embodiment, the system 21 comprises two cameras 210, one in the front of the cabin 20 and one in the rear of the cabin 20.

The at least one camera 210 is configured to acquire a video stream Vs of the cabin 20 of said vehicle 2 (function illustrated in FIG. 6 f1(210, Vs(I), 20)). Said video stream Vs is composed of a plurality of images I.

The electronic control unit 211 is configured to:
  perform some of the steps (E10 to E12, and E14 and E15) of the skin segmentation from images I of said video stream Vs to classify each image pixels p into skin s0 versus non skin s1 as human pixels p0, p1 or into background pixels p2 (function illustrated in FIG. 6 f2(211, I, s1, s0, p0, p1, p2)),
  detect from said images I of said video stream Vs body key points $K_i$ per occupant o within said cabin 20 (function illustrated in FIG. 6 f3(211, I, $K_j$)),
  determine from said body key points $K_i$ body parts B of each occupant o within said cabin 20, a body part B being a connection between at least two body key points $K_i$ (function illustrated in FIG. 6 f4(211,B($K_j$), cI, o)),
  for each image I of the video stream Vs, calculate skin s0 versus non skin s1 percentage levels L over body parts B of each occupant o (function illustrated in FIG. 6 f5(211, I, s0, s1, L, B),
  for each occupant o of the vehicle 2, define clothes type t1 based on said skin s0 versus non skin s1 percentage levels L of each body part B of said occupant o (function illustrated in FIG. 6 f6(211, t1, s0, s1, L, Th1)), In a non-limitative embodiment, the electronic control unit 211 is further configured to calculate a confidence level C regarding said skin s0 versus non skin s1 percentage levels L based on a local moving window of images w1 (function illustrated in FIG. 6 f5'(211, s0, s1, L, w1, C)).

In non-limitative embodiments, the electronic control unit 211 is a central processing unit (CPU), a graphics processing unit (GPU), a digital signal electronic control unit (DSP), an application specific integrated circuit (ASICs), a radio-frequency integrated circuits (RFICs), a reduced instruction set computing electronic control unit (RISC), a complex instruction set computing electronic control unit (CISC), or any suitable combination thereof.

Skin Segmentation Method 3

The skin segmentation method 3 is described hereinafter.

In a non-limitative embodiment, the skin segmentation method 3 is based on a UNET meta-model, also called UNET meta-architecture. The UNET meta-model is referenced 4 in FIG. 7. The UNET meta-architecture is a convolution neural network that has a U-shaped architecture.

As illustrated in FIG. 7, the UNET meta-model comprises en encoder 30, the left part (also called backbone or contracting layer) and a decoder 31, the right part (also called expansive layer). In a non-limitative embodiment, the encoder 30 is a deep learning model. In a non-limitative embodiment illustrated in FIG. 7, the encoder 30 is a UNET RESNET 101 model. The encoder 30 comprises primary convolution blocks B1, also called primary blocks B1 in the following. The decoder 31 comprises secondary convolution blocks B2 also called secondary blocks B2 in the following. The UNET meta-model is symmetrical between the encoder 30 and the decoder 31. Hence, the number of secondary blocks B2 is the same as the number of the primary blocks B1. Each secondary block B2 has a corresponding primary block B1. In the non-limitative example illustrated in FIG. 7, the primary block $B1_5$ has the corresponding secondary block $B2_1$; the primary block $B1_4$ has the corresponding secondary block $B2_2$; the primary block $B1_3$ has the corresponding secondary block $B2_3$; the primary block $B1_2$ has the corresponding secondary block $B2_4$; and the primary block $B1_1$ has the corresponding secondary block $B2_5$.

In a non-limitative embodiment, the encoder 30 is based on primary convolution blocks B1 (with one or a plurality of primary convolution layers L1) each followed by a max pooling with stride 2 for the downsampling (referenced Max_pool in FIG. 7). In a non-limitative embodiment illustrated in FIG. 7, the encoder 30 comprises five primary blocks B1, referenced $B1_1$ to $B1_5$. Each primary block B comprises at least one layer L1.

The first primary block $B1_1$ comprises only one layer L1. In a non-limitative embodiment, each other primary blocks B1 comprises three layers L1 and are repeated a number m of times. For the clarity of the drawing, only the layers L1 of the second primary block $B1_2$ have been referenced. In the non-limitative example illustrated in FIG. 7, save the first primary block $B1_1$ that is not repeated, the second primary block $B1_2$ is repeated 3 times, the third primary block $B1_3$ is repeated 8 times, the fourth primary block $B1_4$ is repeated 36 times, and the fifth primary block $B1_5$ is repeated 3 times.

In a non-limitative embodiment, each primary block B1 comprises two 1×1 convolution layers L1 that permits to reduce the number of weights within the encoder 30. 1×1 is the size of these convolution layers L1. In a non-limitative embodiment, each primary block B1 comprises one 3×3 convolution layer L1. The number of filters for the convolution layer L1 of the primary block $B1_1$ is 64. The number of filters for the convolution layers L1 of the primary block $B1_2$ are respectively 64, 64, and 256. The number of filters for the convolution layers L1 of the primary block $B1_3$ are respectively 128, 128, and 512. The number of filters for the convolution layers L1 of the primary block $B1_4$ are respectively 256, 256, and 1024. The number of filters for the convolution layers L1 of the primary block $B1_5$ are respectively 512, 512, and 2048.

In a non-limitative embodiment, each primary block B1 comprises a skip connection Sk that permits to avoid the problem of vanishing gradient known by the man skilled in the art.

The first primary block $B1_1$ takes as an input an image I1. In a non-limitative embodiment, said image I1 is composed of 384×384 pixels. Said image I1 will be specified in the following when describing the skin segmentation method 3 later in the following.

Each other primary blocks $B1_2$ to $B1_5$ takes as an input the output followed by the max pooling of the preceding primary block B1.

The outputs of each primary layer B1 are primary tensors tr1 with respectively size of (1×192×192×64), (1×96×96×256), (1×48×48×512), (1×24×24×1024), (1×12×12×2048), for the primary blocks $B1_1$ to $B1_5$. As illustrated in FIG. 7, as there is a downsampling, when going from the first primary layer $B1_1$ to the last one $B1_5$, the scale of their primary tensor tr1 decreases compared to the one from the preceding primary layer B1. The primary tensor tr1 is multidimensional. The two first dimensions represent the size of the filter, and the third dimension the number of filters. When the size of the filter decreases (for example from 192×192 to 96×96), then the number of filters increases (for example from 64 to 256).

In a non-limitative embodiment, the decoder 31 is based on based on secondary convolution blocks B2 (comprising one or a plurality of secondary convolution layers L2) each followed by an upsampling (referenced Up_samp in FIG. 7). It is also based on a concatenation cc described in the following. In a non-limitative embodiment illustrated in FIG. 7, the decoder 31 comprises five secondary blocks B2, referenced $B2_1$ to $B2_5$. The first secondary block $B2_1$ comprises only one convolution layer L2, also called layer L2. In a non-limitative embodiment, each other primary block B2 comprises three convolution layers L2. For the clarity of the drawing, only the layers L2 of the second secondary block $B2_2$ have been referenced.

The size of the convolution layers L2 are respectively 12×12, 24×24, 48×48, 96×96 and 192×192 for the secondary blocks $B2_1$ to $B2_5$. The number of filters for the layers L2 of the secondary blocks $B2_1$ to $B2_5$ are respectively 2048, 1024, 512, 256 and 64.

The outputs of each secondary layer B2 are secondary tensors tr2. For the first secondary block $B2_1$, the secondary tensor tr2 is the result of an upsampling block which consists of a 2D convolution transpose with 2×2 kernel (referenced Conv2D (2×2)), with 2×2 the size of the kernel, and then a 2D convolution layer with 3×3 kernel (referenced Conv2D (3×3)), with 3×3 the size of the kernel.

For each other secondary block $B2_2$ to $B2_5$, the secondary tensor tr2 is the result of the upsampling followed by the three convolution layers L2.

As illustrated in FIG. 7, as there is an upsampling, when going from the first secondary block $B2_1$ to the last one B55, the scale of their secondary tensor tr2 increases compared to the one from the preceding secondary block B2. The secondary tensor tr2 is multidimensional. The two first dimensions represent the size of the filter, and the third dimension the number of filters. When the size of the filter increases (for example from 96×96 to 192×192), then the number of filters decreases (for example from 256 to 64). It is a compromised with the size of the input of each secondary block B2.

The first secondary block $B2_1$ is the bottommost block that mediates between the encoder 30 and the decoder 31. The first secondary block $B2_1$ takes as an input the primary tensor tr1 of its corresponding primary block $B1_5$. Said primary tensor tr1 is of the size 12×12×2048.

Each other secondary blocks $B2_2$ to $B2_5$ in the decoder side takes as an input the concatenation cc of:

the primary tensor tr1 of its corresponding primary block $B1_4$ to $B1_1$ respectively, with the output followed by the upsampling of the preceding secondary block B2 from the decoder 31, that is to say the secondary tensor tr2 which is the result of the upsampling block.

The secondary tensor tr2 of the last secondary block B2 of the decoder 31, that is to say $B2_5$, is used to reconstruct an image I2 that is an annotated image I2 with the classification for each pixel p of said image, that is to say with each pixels p labels with the skin class c0, the non-skin class c1 and the background class c2. Each image pixels p is classified into skin s0 versus non skin s1 as human pixels p1, p0 or into background pixels p2. As illustrated in FIG. 7, the annotated image I2 is the result of an upsampling block that is applied to the secondary tensor tr2 (of the secondary block $B2_5$). Said upsampling block consists of a 2D convolution transpose with kernel 2×2 (referenced Conv2D (2×2)) and then a 2D convolution layer with 3×3 kernel (referenced Conv2D (3×3)).

Hence, the output of the decoder 31 is an annotated image I2. In a non-limitative embodiment, the size of said annotated image I2 is of 384×384×3, as there are three different classes c0, c1, c2. Said annotated image I2 will be specified in the following when describing the skin segmentation method 3 hereinafter.

As above-mentioned, the aim of the skin segmentation method 3 is to classify pixels p of an image I into a plurality of classes within which a skin class c0, a non-skin class c1 and a background class c2, wherein said image I is coming from the cabin 20 of the vehicle 2.

As we will see in detail hereinafter, the skin segmentation method 3 is using two different datasets of images, a primary dataset DS1 with a huge number of images, and a secondary dataset DS2 with a few number of images.

The primary dataset DS1 is a dataset of primary annotated images I10 (also called images I10 in the following) that represents real images of persons o wearing different types of clothes and with labels relative to the skin class c0, the non skin class c1 and the background class c2. One label is therefore associated to each pixel p of an image I10. But, these real images are taken outside the context of the cabin 20 of the vehicle 2 where the luminance is higher than within the cabin 20. The primary annotated images I10 are images that are not related to the environment of a cabin 20 of a vehicle 2. The primary dataset DS1 comprises a primary number N1 of annotated images I10. In a non-limitative example, the primary number N1 is around 40000. In non-limitative embodiments, the primary dataset DS1 of annotated images I10 is a MHP dataset ("Multi Human Parsin") or a CIHP dataset ("Crowd Instance-level Human Parsing").

The secondary dataset DS2 is a dataset of non-annotated images I20 (also called images I20 in the following) that represents real images of persons o wearing different types of clothes and with no labels at all. Contrary to the images I10, these real images I20 are taken within the context of the cabin 20 of the vehicle 2. Hence, the real images of persons are images of persons within the cabin 20 of the vehicle 2. In a non-limitative embodiment, said non-annotated images I20 are extracted from a video stream of a camera fisheye 210, as can be observed in the non-limitative examples of images in FIGS. 2, 3 and 4. The secondary dataset DS2 comprises a secondary number N2 of non-annotated images I20. In a non-limitative example, the secondary number N2 is around 100. Hence, it is significantly lower than the primary number N1. Hence, it is easy, costless, and fast, for a vehicle constructor for example to build up its own secondary dataset DS2, and to have a proprietary secondary dataset DS2. This second data set DS2 will permit to fine-tune the UNET meta-model.

The skin segmentation method 3 is described in reference to FIG. 8. The aim of the skin segmentation method 3 is to classify pixels p of an image into a plurality of classes within which a skin class c0, a non-skin class c1 and a background class c2, wherein said image is coming from a cabin 20 of a vehicle 2.

In step E10, illustrated F10(UNET(30, 31), ST1, DS1 (I10, N1), M1($p$, c0, c1, c2)), the UNET meta-model is trained, said training being based on a primary sub-set ST1 of the primary dataset DS1 comprising the primary number N1 of primary annotated images I10 of persons wearing different type of clothes. Said UNET meta-model comprises the encoder 30 that cooperates with the decoder 31 to output skin segmented images M1 comprising pixels p wherein said pixels p are associated to one class among said skin class c0, said non-skin class c1 and said background class c2. In other words, said skin segmented images M1 is an annotated image with labels relative to the skin class c0, the non skin class c1 and the background class c2.

The training is performed on each primary annotated image I10 of the sub-set ST1. In a non-limitative example, the primary sub-set ST1 comprises 30 000 primary annotated images I10 out of the 40 000 of primary annotated images I10 within said primary dataset DS1.

Hence, for this first training phase (also called first training step) based on the primary dataset DS1:
the input of the first primary block $B1_1$ of the encoder 30 (described before) is a primary annotated image I10. Hence, the image I1 mentioned before is a primary annotated image I10, and
the output of the decoder 31 (described before) is a skin segmented image M1. Hence, the image I2 mentioned before is a skin segmented image M1.

In a non-limitative example, a batch of 16 images I10 is used for this training phase.

The training phase is based on the computing of a loss function and on adjusting the weights of the convolution layers L1, L2 of the encoder 30 and the decoder 31 in order to minimize the loss function. In a non-limitative embodiment, the loss function is a cross entropy. In a non-limitative embodiment, one adjusts the weights using back propagation until a convergence of the UNET meta-model is reached. The convergence of the UNET meta-model means that the loss function is minimized. It means that at the output of the decoder 31 a pixel p within the skin segmented image M1 is associated with a class c that is the closest (has the closest value) to the class c of the corresponding pixel p within the annotated primary image I10 at the input of the encoder 30, and this for all the pixels p of the skin segmented image M1.

In step E11, illustrated F11(UNET(30, 31), ST1', DS1 (I10), A1)), the UNET meta-model is tested with a secondary sub-set ST1' from said primary dataset DS1, said secondary sub-set ST1' being the supplementary subset to said primary sub-set ST1. In a non-limitative example, the secondary sub-set ST1' comprises 10 000 primary annotated images I10 out of the 40 000 of primary annotated images I10 within said primary dataset DS1. Said testing phase leads to a primary accuracy percentage A1. In a non-limitative embodiment, the testing uses a metric that is the mIoU "mean intersection over union" well-known by the man skilled in art.

Hence, for this testing phase (also called testing step):
the input of the first primary layer $B1_1$ of the encoder 30 (described before) is a primary annotated image I10. Hence, the image I1 mentioned before is a primary annotated image I10, and
the output of the decoder 31 (described before) is a skin segmented image M1. Hence, the image I2 mentioned before is a skin segmented image M1.

In the testing phase, the image I1 and the image I2 are compared according to a metric, which is the mIoU in a non-limitative example.

In step E12, illustrated F12(UNET(30, 31), DS2(I20, N2), M2($p$, c0, c1, c2)), said UNET meta-model is run with the secondary dataset DS2. Said running phase leads to output skin segmented images M2 comprising pixels p wherein said pixels p are associated to one class among said skin class c0, said non-skin class c1 and said background class c2. A pixel p associated with a class is also called annotated pixel p. This running phase (also called running step) allows a tuning of the UNET meta-model with specific images that are here some images I20 of persons within the cabin 20 of the vehicle 2 as mentioned before. It is to be noted that said images I20 are specific in the sense that their luminance is lower than those images I10 of the primary dataset DS2 used for the first training phase E10.

Hence, for this running phase:
the input of the first primary layer $B1_1$ of the encoder 30 (described before) is a secondary non-annotated image I20. Hence, the image I1 mentioned before is a secondary non-annotated image 120, and
the output of the decoder 31 (described before) is a skin segmented image M2. Hence, the image I2 mentioned before is a skin segmented image M2.

The number of skin segmented image M2 is the same as the number of the secondary dataset DS2. Hence, in the non-limitative given example, it is equal to 100.

In step E13, illustrated F13(M2, DS2')), some of said skin segmented images M2 are fixed to create a skin segmented secondary dataset DS2'.

The fixing is performed manually. It corrects the class c associated to some pixels p of the segmented images M2, those pixels p whose class c has been wrongfully attributed during the running phase E12.

This fixing phase (also called fixing step) is interesting when on the output image that is a skin segmented image M2, one observes some inconsistency between a series of neighbor pixels p regarding their associated class c. In other words, when one observes some ranges of pixels p with non-uniform labels within a region r containing the same kind of annotated pixels p. For example, the region r represents part of a cloth, but there is a hole within said part of cloth. In another example, the region r represents the background but there is a small spot of skin within said background. Those non-limitative examples are illustrated in FIG. 9. In a non-limitative example illustrated in FIG. 9, if in a skin segmented image M2, there is a region r1 with annotated pixels p (referenced p1) of the class non-skin c1, and within said region r1, there are a few annotated pixels p (referenced p0) that are of the skin class c0, one can deduce, that there was an error. This error is manually corrected. The labels of these annotated pixels p0 are modified in order to have a region r1 with only annotated pixels p1. The labels are amended from skin class c0 to non-skin class c1.

In another non-limitative example illustrated in FIG. 9, if there is another region r2 with annotated pixels p (referenced p2) that are of the class background class c2, and within said region r2, there are a few annotated pixels p (referenced p0)

that are of the skin class c0, one can deduce, that there was an error. This error is manually corrected. The labels of these annotated pixels p0 are modified in order to have a region r2 with only annotated pixels p2. The labels are amended from skin class c0 to background class c2.

Hence, the skin segmented images M2 that have been fixed and those that have not been fixed because they don't need to, composed a new dataset, that is to say the skin segmented secondary dataset DS2'. This skin segmented secondary dataset DS2' is therefore a dataset with annotated images that will be used to perform an increase of the data within the primary dataset DS1 used to train the UNET meta-model leading to an augmented dataset DS1'. This data increase allows a retraining of the UNET meta-model, and permits to fine-tune the UNET meta-model as it uses images from the cabin 20 of the vehicle 2 with other images that are not related to the environment of the cabin 20.

Hence, in step E14, illustrated F14(UNET(30, 31), DS1', M2'(p, c0, c1, c2)), the UNET meta-model is retrained with a combination of a third subset ST2 of said skin segmented secondary dataset DS2' with the primary dataset DS1, said combination forming an augmented dataset DS1'. In a non-limitative example, the third subset ST2 comprises 80 images out of 100 of the skin segmented secondary dataset DS2'. The whole primary dataset DS1 is included in the augmented dataset DS1'. Therefore, in the non-limitative given example, the augmented dataset DS1' comprises 40 080 annotated images.

The retraining is performed on each annotated image of the augmented dataset DS1'. Hence, for this retraining phase (also called retraining step) based on the augmented dataset DS1':
the input of the first primary layer $B1_1$ of the encoder 30 (described before) is a primary annotated image I10 or an annotated image M2. Hence, the image I1 mentioned before is a primary annotated image I10 or an annotated image M2, and
the output of the decoder 31 (described before) is a skin segmented image M2'. Hence, the image I2 mentioned before is a skin segmented image M2'.

Hence, said retraining phase outputs skin segmented images M2' with pixels p wherein said pixels p are associated to one class among said skin class c0, said non-skin class c1 and said background class c2.

In a non-limitative example, a batch of 16 images is used for this training phase.

As for the training phase E10, this retraining phase is based on the computing of a loss function and on adjusting the weights of the convolution layers L1, L2 of the encoder 30 and the decoder 31 in order to minimize the loss function. In a non-limitative embodiment, the loss function is a cross entropy. In a non-limitative embodiment, one adjusts the weights using back propagation until a convergence of the UNET meta-model is reached.

The convergence of the UNET meta-model means that the loss function is minimized. That is to say at the output of the decoder 31 a pixel p within the skin segmented image M2' is associated with a class c that is the closest (has the closest value) to the class c of the corresponding pixel p within the annotated primary image I1 at the input of the encoder 30, and this for all the pixels p of the skin segmented image M2'.

In step E15, illustrated F15(UNET(30, 31), ST2', DS2', A2)), the UNET meta-model is tested with a fourth sub-set ST2' of said skin segmented secondary dataset DS2', said fourth sub-set ST2' being the supplementary subset to said third sub-set ST2. In a non-limitative example, the fourth sub-set ST2' comprises 20 annotated images out of 100 of the skin segmented secondary dataset DS2'. Said testing phase leads to a secondary accuracy percentage A2. In a non-limitative embodiment, the testing uses a metric that is the mIoU "mean intersection over union" well-known by the man skilled in art.

This secondary accuracy percentage A2 is higher than the primary accuracy percentage A1, because by mixing some data from the primary dataset DS1 (MHP dataset in a non-limitative given example) and from the skin segmented secondary dataset DS2', one fine-tunes the UNET meta-model with more data inside the vehicle cabin 20 with similar data distribution as the secondary dataset DS2. The UNET meta-model performance is improved from the previous step where the UNET meta-model model was trained only on the primary dataset DS1, because we added some of the correctly annotated data of the skin segmented secondary dataset DS2' in the train dataset.

This testing phase (also called testing step) permits to verify that the UNET meta-model is accurate for a dataset comprising images of persons within the cabin 20 of the vehicle 2.

Hence, for this testing phase:
the input of the first primary layer $B1_1$ of the encoder 30 (described before) is a skin segmented images M2 with the corrected annotation. Hence, the image I1 mentioned before is a skin segmented images M2 with the corrected annotation, and
the output of the decoder 31 (described before) is a skin segmented image with annotated pixels p, said pixels being classified into skin s0 versus non skin s1 as human pixels p1, p0, or into background pixels p2. Hence, the image I2 mentioned before is a skin segmented image with annotated pixels p.

The image I1 and the image I2 are compared according to a metric, which is the mIoU in a non-limitative example.

This testing phase is the final step of the training of the UNET meta-model, before the UNET meta-model can be deployed in the vehicle. When deployed in the vehicle, the UNET meta-model can be used in the inference mode, where some video streams of the vehicle cabin 20 are input to the UNET meta-model to perform skin segmentation on the images of said video streams.

It is to be understood that the present invention is not limited to the aforementioned embodiments and variations and modifications may be made without departing from the scope of the invention. In another non-limitative embodiment, the method 1 can be used for interiors scenes like vehicles, airplanes and smart homes. Skin segmentation and clothes type could help interior heat isolation for any kind of these interior scenes.

Hence, some embodiments of the invention may comprise one or a plurality of the following advantages:
it allows using interior camera(s) 210 in combination with UNET meta-model and semi-supervised learning model as skin segmentation and body parts to extract precise skin and clothing level measurements per occupant o,
it allows grouping information from different models as skin segmentation and body parts which leads to more precise level as classification and percentage level L per body part B instead of classification only,
it allows performing climate control and isolation for each occupant o individually,
it allows building up a specific dataset of persons within a cabin 20 of a vehicle that comprises few images compared to the MHP or CIHP dataset available, and that comprises images of persons within a cabin contrary to the MHP or CIHP dataset available, Hence, the UNET meta-model that has been described works well with images of persons wearing different type of clothes who are within a cabin 20 of a vehicle 2.

The invention claimed is:

1. A method for defining the clothes type of an occupant of a vehicle, the method comprising:
   acquiring at least one video stream of the cabin of the vehicle,
   performing skin segmentation from images of the at least one video stream to classify each image pixels into skin versus non skin human pixels or into background pixels,
   detecting from the images of the video stream, body key points per occupant within the cabin,
   determining from the body key points, body parts of each occupant within the cabin, a body part being a connection between at least two body key points,
   for each image of the video stream, calculating skin versus non skin percentage levels over body parts of each occupant,
   for each occupant of the vehicle, defining clothes type based on the skin versus non skin percentage levels of each body part of the occupant, and
   calculating a confidence level regarding the skin versus non skin percentage levels based on a local moving window of images.

2. The method according to claim 1, wherein the skin segmentation is based on a UNET meta-model.

3. The method according to claim 1, wherein the body key points detection is based on a semi-supervised learning model.

4. The method according to claim 1, wherein the defining of clothes type is based on a comparison of the skin and non skin percentage levels to a threshold.

5. The method according to claim 1, wherein the body parts are: a face, a torso, a neck, a right/left upper arm, a right/left lower arm, a right/left hand, an upper right/left knee leg.

6. The method according to claim 1, wherein the clothes type is defined among short/long/bottom cloth, or short/long sleeves top cloth.

7. The method according to claim 1, wherein the skin segmentation step is based on a convolution neural network that combines a RESNET-101 model as an encoder and a UNET model as a decoder.

8. A system for defining the clothes type of an occupant of a vehicle,
   the system comprising at least one camera configured to acquire a video stream of the cabin of the vehicle,
   wherein the system further comprises an electronic control unit configured to:
      perform skin segmentation from images of the video stream to classify each image pixels into skin versus non skin human pixels or into background pixels,
      detect from the images of the video stream, body key points per occupant within the cabin,
      determine from the body key points, body parts of each occupant within the cabin, a body part being a connection between at least two body key points,
      for each image of the video stream, calculate skin versus non skin percentage levels over body parts of each occupant,
      for each occupant of the vehicle, define clothes type based on the skin versus non skin percentage levels of each body part of the occupant, and
      wherein the electronic control unit is further configured to calculate a confidence level regarding the skin versus non skin percentage levels based on a local window of images.

9. The system according to claim 8, wherein the at least one camera is a camera fisheye.

10. A skin segmentation method for classifying pixels of an image into a plurality of classes,
    wherein the plurality of classes comprises a skin class, a non-skin class and a background class, wherein the image is coming from a cabin of a vehicle, and wherein the method comprises:
       training a UNET meta-model for the classification, the training being based on a primary sub-set of a primary dataset comprising a primary number of primary annotated images of persons wearing different type of clothes,
       the UNET meta-model comprising an encoder that is a deep learning model that cooperates with a decoder to output skin segmented images with pixels wherein the pixels are associated to one class among the skin class, the non-skin class and the background class,
       testing the UNET meta-model with a secondary sub-set of the primary dataset, the secondary sub-set being the supplementary subset to the primary sub-set, the testing leading to a primary accuracy percentage,
       running the UNET meta-model with a secondary dataset comprising a secondary number of non-annotated images of persons wearing different type of clothes within a cabin of a vehicle, the secondary number being at least a hundred times smaller than the primary number, the running leading to output skin segmented images with pixels,
       wherein the pixels are associated to one class among the skin class, the non-skin class and the background class,
       fixing some of the skin segmented images to create a skin segmented secondary dataset,
       combining a third subset of the skin segmented secondary dataset with the primary dataset to form an augmented dataset, and retraining the UNET meta-model with this augmented dataset, retraining outputting skin segmented images with pixels wherein the pixels are associated to one class among the skin class, the non-skin class and the background class,
       testing the UNET meta-model with a fourth sub-set of the skin segmented secondary dataset, the fourth sub-set being the supplementary subset to the third sub-set, the testing leading to a secondary accuracy percentage.

11. The skin segmentation method according to claim 10, wherein the secondary dataset comprises non-annotated images of real images of persons within a cabin of the vehicle, wherein the persons are wearing different types of clothes.

12. The skin segmentation method according to claim 10, wherein the non-annotated images are extracted from a video stream of a camera fisheye.

13. The skin segmentation method according to claim 10, wherein the encoder is a UNET RESNET 101 model.

14. The skin segmentation method according to claim 10, wherein the primary dataset of is a Multi Human Parsing (MHP) dataset or a Crowd Instance-Level Human Parsing (CIHP) dataset.

15. The skin segmentation method according to claim 10, wherein the primary number of the primary dataset is around 40000.

16. The skin segmentation method according to claim 10, wherein the secondary number of the secondary dataset is around 100.

\* \* \* \* \*